(12) United States Patent
Tang et al.

(10) Patent No.: US 11,213,884 B1
(45) Date of Patent: Jan. 4, 2022

(54) STATIONARY VACUUM VALVE

(71) Applicant: METAL INDUSTRIES RESEARCH AND DEVELOPMENT CENTRE, Kaohsiung (TW)

(72) Inventors: Nai-Kuang Tang, Kaohsiung (TW); Chih-Wei Lu, Kaohsiung (TW); Wan-Yun Huang, Kaohsiung (TW); Chien-Li Lai, Kaohsiung (TW)

(73) Assignee: METAL INDUSTRIES RESEARCH AND DEVELOPMENT CENTRE, Kaohsiung (TW)

(\*) Notice: Subject to any disclaimer, the term of this patent is extended or adjusted under 35 U.S.C. 154(b) by 0 days.

(21) Appl. No.: 17/124,672

(22) Filed: Dec. 17, 2020

(51) Int. Cl.
*B22D 17/14* (2006.01)
*B22D 17/20* (2006.01)
*F16K 51/02* (2006.01)

(52) U.S. Cl.
CPC .......... *B22D 17/145* (2013.01); *B22D 17/20* (2013.01); *F16K 51/02* (2013.01)

(58) Field of Classification Search
CPC ...... F16K 51/02; F16K 49/007; F16K 49/005; F16K 13/10; B22D 17/145; B22D 17/14; B22D 17/20
USPC ................................................. 164/305, 410
See application file for complete search history.

(56) References Cited

U.S. PATENT DOCUMENTS

| 3,266,099 | A | * | 8/1966 | Bucy | B29C 45/34 249/141 |
| 5,586,596 | A | * | 12/1996 | Freeman | B22D 17/145 164/253 |
| 5,913,355 | A | * | 6/1999 | Muramatsu | B22D 17/145 164/305 |
| 5,913,356 | A | * | 6/1999 | Muramatsu | B22D 17/145 164/305 |
| 6,425,433 | B1 | * | 7/2002 | Hayes | B22D 17/14 164/113 |
| 7,134,637 | B2 | * | 11/2006 | Dubay | B22D 17/145 249/141 |

(Continued)

FOREIGN PATENT DOCUMENTS

| GB | 855495 | A | * | 11/1960 | ............. B22D 17/14 |
| JP | 01258860 | A | * | 10/1989 | |
| JP | 4644645 | B2 | | 3/2011 | |

*Primary Examiner* — David Colon-Morales
(74) *Attorney, Agent, or Firm* — Osha Bergman Watanabe & Burton LLP

(57) ABSTRACT

A vacuum valve includes first and second blocks. The first block includes a base portion and a frustoconical guiding portion connected to the base portion and tapering away from the base portion to form a shoulder, and defines a discharging channel extending in the base portion and through the guiding portion, in spatial communication with ambient surroundings, and adapted to permit air to flow therethrough and into the ambient surroundings. The second block has an end surface cooperating with the shoulder to define an opening communicated spatially with the ambient surroundings, and an inner surface connected to the end surface and cooperating with the frustoconical guiding portion to define a spiral fluid channel therebetween. The spiral fluid channel is in spatial communication with the discharging channel and the opening, and is for introducing air into the discharging channel via the opening.

8 Claims, 3 Drawing Sheets

(56) References Cited

U.S. PATENT DOCUMENTS

| | | | | |
|---|---|---|---|---|
| 7,631,851 B2 * | 12/2009 | Dubay | ............... | B29C 45/34 |
| | | | | 249/141 |
| 7,770,627 B2 * | 8/2010 | Wang | ............. | B22D 17/145 |
| | | | | 164/305 |
| 8,336,600 B2 * | 12/2012 | Baumgartner | ..... | B22D 17/2227 |
| | | | | 164/61 |
| 8,424,587 B1 * | 4/2013 | Dubay | ............... | B29C 45/34 |
| | | | | 164/305 |
| 8,863,817 B2 * | 10/2014 | Castle | ............. | B22D 21/025 |
| | | | | 164/305 |
| 9,050,653 B2 | 6/2015 | Bigger et al. | | |
| 9,272,326 B2 * | 3/2016 | Werner | ............. | B22C 9/067 |
| 11,065,679 B2 * | 7/2021 | Yi | ..................... | B22D 18/06 |
| 2020/0353535 A1 * | 11/2020 | Kim | .................. | B22D 17/24 |

* cited by examiner

STATIONARY VACUUM VALVE

FIELD

The disclosure relates to a vacuum valve, more particularly to a vacuum valve used in a die casting process.

BACKGROUND

In the field of metalworking, die casting relates to a technique that molten metal is injected into a mold by pressurized gas such as air. The pressurized gas is applied to the mold until the molten metal received in the mold is solidified. However, air tends to enter the mold and the molten metal when injecting the molten metal into the mold. Consequently, the finished product (solidified metal) may be formed with some air bubbles due to air is mixed into the molten metal.

In order to reduce the air bubbles in the finished product, a conventional vacuum device including a vacuum valve, a vacuum hose, a vacuum chamber, and a vacuum pump that are sequentially connected is employed to provide suction force to suck the air out of the mold. The vacuum valve is connected to the mold, is in spatial communication with a space defined by the mold, and is operable to be opened and closed to respectively permit and prohibit fluid such as air to flow therethrough. When the vacuum valve is opened, the vacuum device sucks the air out of the mold through the vacuum valve. After the air in the mold is all vacuumed out, the molten metal may also be sucked out of the mold, which may damage the vacuum device. Thus, it is required to close the vacuum valve at an optimal time.

Vacuum valves can be categorized into three types, which are active, passive and stationary types. The active type vacuum valves are also know as metal actuated vacuum valves, the passive type vacuum valves are also known as time control or sensor-actuated vacuum valves, and the stationary type vacuum valves are also known as chill vent vacuum valves. The former two types of the vacuum valves are distinguished based on the manner to close the vacuum valves. Japanese Patent No. 4644645B2 discloses a passive type vacuum valve that includes a switch to close the vacuum valve once the molten metal enters the vacuum valve. However, such active vacuum valve has a relatively complex structure and is relatively expensive.

An active type of vacuum valve disclosed in U.S. Pat. No. 9,050,653B2 has a relatively simple structure and the cost thereof is relatively low. Such active type of vacuum valve is controlled by an operator to manually close the vacuum valve. However, it is required to calculate the optimal time to close the vacuum valve and the time duration to inject molten metal into a mold in advance and the manually control to the vacuum valve is labor intensive. Further, in order to prevent the molten metal from flowing into the vacuum device, an operator tends to early close the vacuum valve. Consequently, the vacuum valve may be closed too early (i.e., before all the air in the molds is vacuumed out).

A stationary type of vacuum valve has a structure different from those disclosed in the above conventional vacuum valve. Such stationary type of vacuum valve cannot be closed or opened and is formed with a fluid passage that is fluidly communicated with the vacuum hose and the mold and that has a relatively small cross sectional area. After the air is all sucked out of the mold, the molten metal enters the fluid passage and then is cooled down and solidified to block the fluid passage. That is to say, the design of the fluid passage should be long enough for the molten metal to be cooled down and solidified therein such that the fluid passage is blocked by the solidified metal to prevent molten metal from flowing into the vacuum pump. Additionally, in order to increase the speed at which the molten metal in the fluid passage to be cooled down, a heat dissipating device is provided around the fluid passage. Consequently, the space occupied by an assembly of the stationary type of vacuum valve and the heat dissipating device is relatively large.

SUMMARY

Therefore, an object of the disclosure is to provide a vacuum valve capable of alleviating the drawbacks of the conventional vacuum valve.

According to an aspect of the disclosure, a vacuum valve includes a first block and a second block. The first block includes a base portion and a frustoconical guiding portion. The frustoconical guiding portion is connected to the base portion and tapers away from the base portion to form a shoulder between the base portion and the frustoconical guiding portion. The first block defines a discharging channel. The discharging channel extends in the base portion and through the guiding portion, is in spatial communication with ambient surroundings, and is adapted to permit air to flow therethrough and into the ambient surroundings. The second block has an end surface and an inner surface. The end surface cooperates with the shoulder to define an opening therebetween. The opening is adapted to communicate spatially with the ambient surroundings. The inner surface of the second block is connected to the end surface and cooperates with the frustoconical guiding portion of the first block to define a spiral fluid channel therebetween. The fluid channel is in spatial communication with the discharging channel and the opening, and is adapted for introducing air into the discharging channel via the opening.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
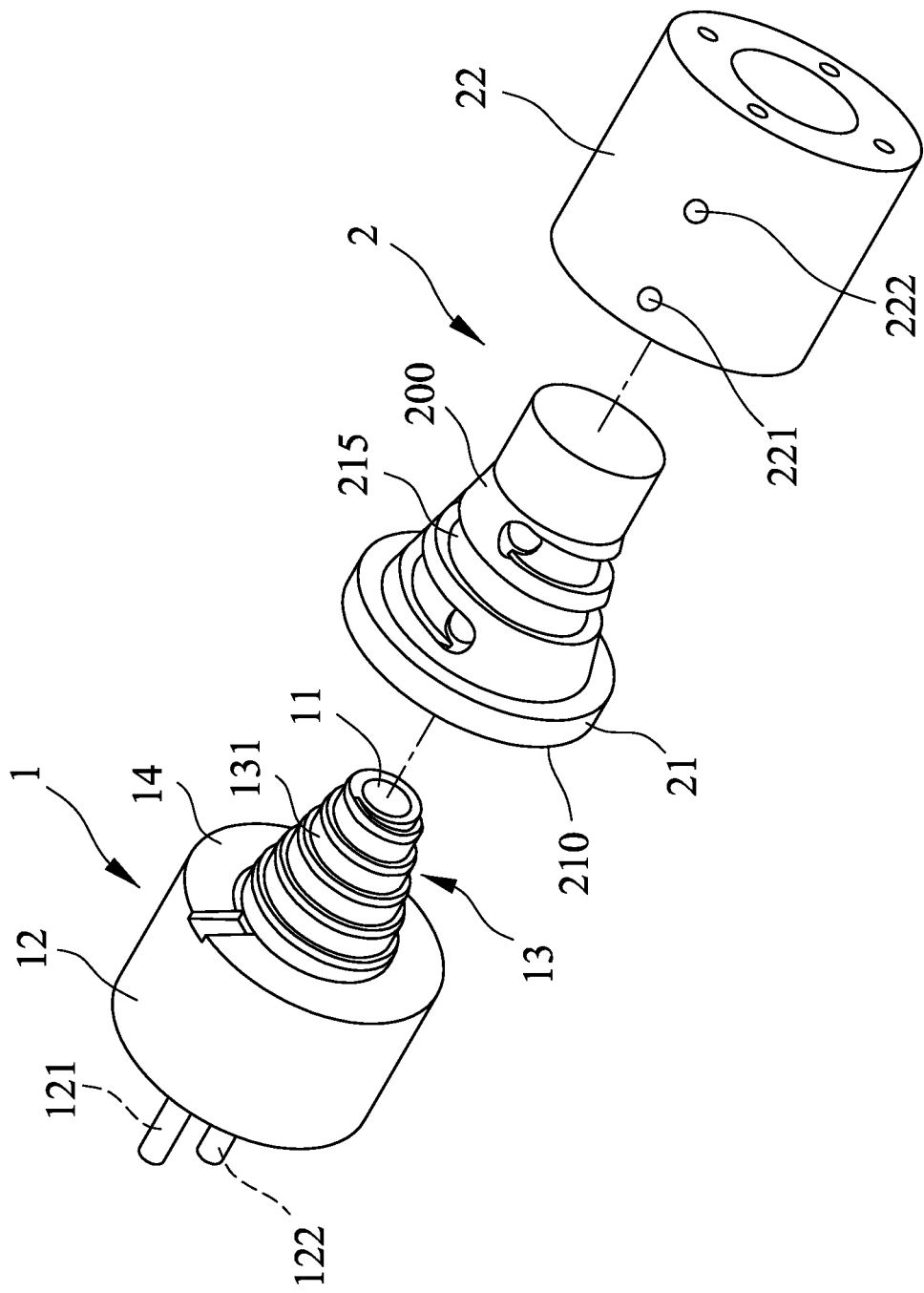
FIG. 1 is a partly exploded perspective view of a vacuum valve according to an embodiment of the present disclosure.
Figure 2:
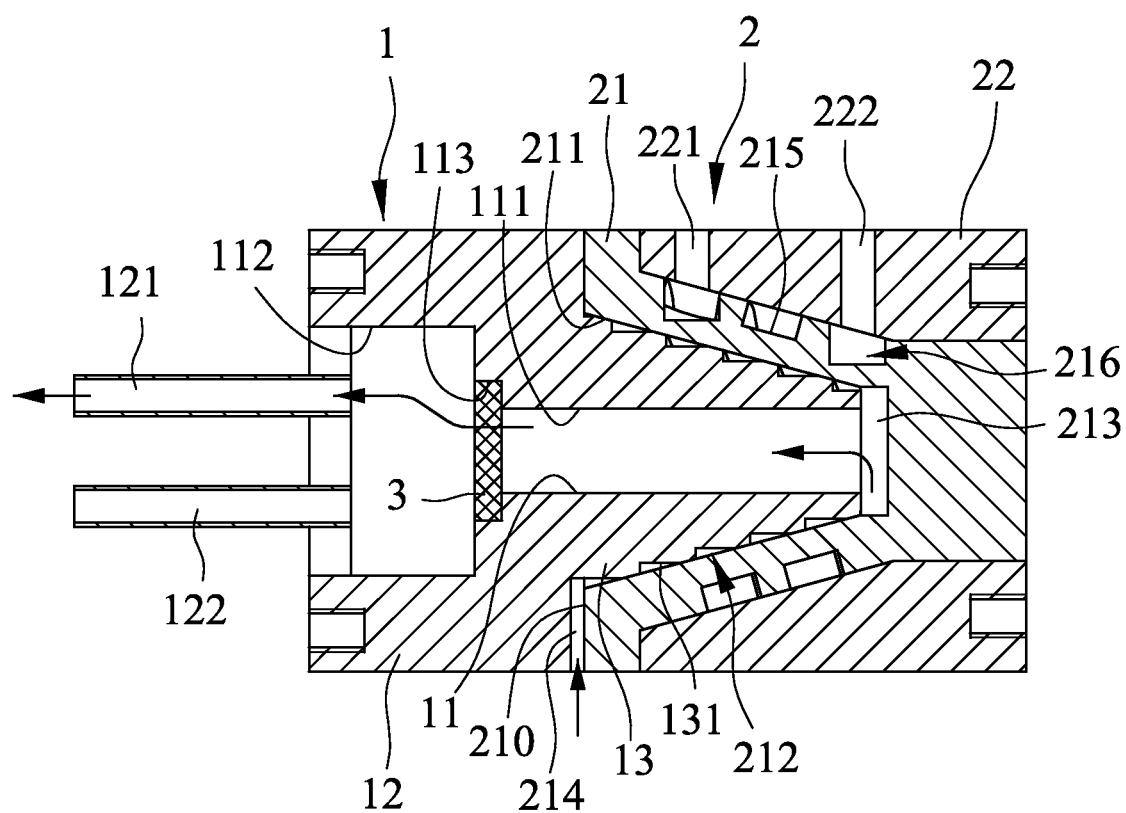
FIG. 2 is a schematic sectional view of the vacuum valve of the embodiment.
Figure 3:
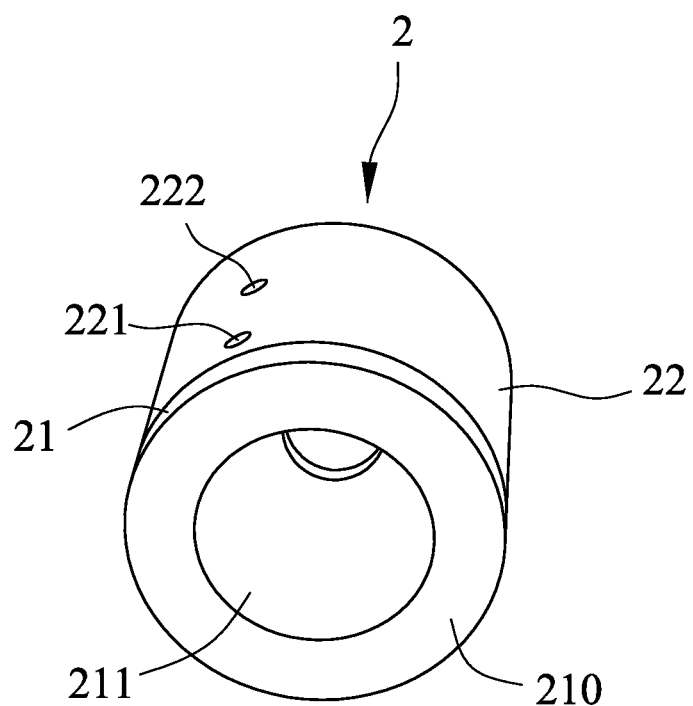
FIG. 3 is a schematic perspective view of a second block of the vacuum valve of the embodiment.

Referring to FIGS. 1 to 3, an embodiment of a vacuum valve according to the present disclosure is shown. the vacuum valve includes a first block 1, a second block 2, and a filtering unit 3 (see FIG. 2). The first block 1 includes a base portion 12 and a frustoconical guiding portion 13. The frustoconical guiding portion 13 is connected to the base portion 12, and tapers away from the base portion 12 to form a shoulder 14 between the base portion 12 and the frustoconical guiding portion 13.

The first block 1 defines a discharging channel 11 extending in the base portion 12 and through the frustoconical guiding portion 13, in spatial communication with ambient surroundings, and adapted to permit air to flow therethrough and into the ambient surroundings. The discharging channel 11 has a large diameter segment 112 in the base portion 12, a small diameter segment 111 that has a dimension smaller than that of the large diameter segment 112 and extending through the frustoconical guiding portion 13 and into the base portion 12, and an intermediate diameter segment 113 disposed between the large diameter segment 112 and the small diameter segment 111 and having a diameter smaller than that of the large diameter segment 112 and larger than the diameter of the small diameter segment 111. The filtering unit 3 is detachably mounted between the large diameter segment 112 and the small diameter segment 111 in the discharging channel 11 and is adapted for filtering particles in the air flowing therethrough.

Specifically, the base portion 12 is formed with an outlet 121 and a blowing inlet 122. The outlet 121 is in spatial communication with the discharging channel 11 and is adapted to permit air introduced into the discharging channel 11 to discharge out of the discharging channel 11 therethrough. The blowing inlet 122 is in spatial communication with the discharging channel 11, is disposed downstream of the filtering unit 3 in the discharging channel 11, and is adapted to permit air to be forced into the discharging channel 11 to blow the particles accumulated on the filtering unit 3 away from the filtering unit 3. In this embodiment, a blowing device (not shown) capable of blowing air is fluidly communicated with the blowing inlet 122 to blow air into the discharging channel 11.

The frustoconical guiding portion 13 of the first block 1 has an outer surface formed with a groove 131 that extends spirally from one end of the frustoconical guiding portion 13 to the other end of the frustoconical guiding portion 13 and that has at least three turns. In this embodiment, the groove 131 has 3.5 turns.

In this embodiment, the frustoconical guiding portion 13 of the first block 1 has a cone angle ranging from 5 degrees to 30 degrees. The groove 131 has a draft angle ranging from 1 degree to 3 degrees. The base portion 12 is a cylinder and the frustoconical guiding portion 13 is a truncated cone, but the configuration of the base portion 12 and the frustoconical guiding portion 13 is not limited to those described herein.

The second block 2 includes a receiving portion 21 and an external fixing portion 22. The receiving portion 21 has a frustoconical intermediate portion 200, receives the frustoconical guiding portion 13 therein, and has an inner surface 211 and an end surface 210. The end surface 210 of the receiving portion 21 cooperates with the shoulder 14 of the first block 1 to define an opening 214 therebetween. The opening 214 extends radially along the shoulder 14 and is adapted to communicate spatially with the ambient surroundings. The inner surface 211 of the receiving portion 21 is connected to the end surface 210 and cooperates with the groove 131 formed in the frustoconical guiding portion 13 to define a spiral fluid channel 212 therebetween. The spiral fluid channel 212 is in spatial communication with the discharging channel 11 and the opening 214, and is adapted for introducing air into the discharging channel 11 via the opening 214. Since the groove 131 is a 3.5 turn helical groove, as compared to the fluid passage of the conventional stationary type of vacuum valves described in the background section, the length of the spiral fluid channel 212 is at least ten times of the length of the conventional fluid passage.

In this embodiment, the inner surface 211 of the receiving portion 21 cooperates with a distal end of the frustoconical guiding portion 13 that is distal from the base portion 12 to define a cylindrical guiding channel 213 in spatial communication with the discharging channel 11 and the fluid channel 212.

The external fixing portion 22 is sleeved on the receiving portion 21, and cooperates with the receiving portion 21 to define a cooling channel 216 therebetween. Specifically, the receiving portion 21 has an outer surface formed with a spiral flowway 215 that cooperates with an inner surface of the external fixing portion 22 to define the cooling channel 216 therebetween. The cooling channel 216 extends spirally around the receiving portion 21 and surrounds the fluid channel 212.

Further, the external fixing portion 22 is formed with an inlet 221 and an outlet 222 that are in spatial communication with the cooling channel 216, so as to allow a cooling fluid to flow into the cooling channel 216 through the inlet 221 and out of the cooling channel 216 through the outlet 222, thereby dissipating heat from the fluid channel 212.

In the following, how the vacuum valve of the present disclosure is used in a vacuum device including a vacuum hose, a vacuum chamber and a vacuum pump for die casting is to be described. In a die casting process, molten metal is injected into a mold unit (not shown) that includes a core mold and a cavity mold. The core mold and the cavity mold are connected respectively to the first block 1 and the second block 2 through fastening members such as screws. At this time, the first and second blocks 1, 2 are separated.

When the core mold contacts the cavity mold such that the mold unit is in a closed position, the first and second blocks 1, 2 are connect to each other, i.e., the receiving portion 21 of the second block 2 receives the frustoconical guiding portion 13 of the first block 1 therein. Then, the second block 2 is connected to the cavity mold such that the opening 214 is in spatial communication with a mold cavity in the cavity mold, and the first block 1 is connected to the vacuum hose, which is connected to the vacuum pump, so as to suck the air out of the molten metal in the mold unit. Due to the negative pressure provided by the vacuum pump, the air in the mold unit enters the fluid channel 212 via the opening 214, flows through the cylindrical guiding channel 213 to enter the discharging channel 11, and then is discharged out of the vacuum valve through the outlet 121 into the vacuum chamber. It should be noted that air would not flow into the blowing inlet 122 since the blowing inlet 122 is closed.

At this time, cooling fluid, e.g., water or refrigerant, is introduced into the cooling channel 216 through the inlet 221 and flows out of the cooling channel 212 through the outlet 222, thereby dissipating heat from the fluid channel 212.

After the air in the mold unit is all sucked out of the mold unit, the vacuum pump continues to apply negative pressure to the vacuum valve and thus molten metal in the mold unit flows into the fluid channel 212 via the opening 214 and is cooled and solidified by the cooling fluid in the cooling channel 216. Since the fluid channel 212 is spiral and has a relatively long length (i.e., ten times of the length of the conventional fluid passage described in the background section), the molten metal flowing into the fluid channel 212 is cooled and solidified at a relatively high speed, so as to block the cooling channel 216. In this way, the molten metal is prevented from flowing into the vacuum chamber and the vacuum pump to damage the same.

After the molten metal in the mold unit is solidified, the mold unit can be brought into an open position where the core mold is separated from the cavity mold, and the first and second blocks 1, 2 connected respectively to the core mold and the cavity mold are also separated. By virtue of the configuration of the frustoconical guiding portion 13 that has a cone angle ranging from 5 degrees to 30 degrees and that is formed with the groove 131 having a draft angle ranging from 1 degree to 3 degrees, separation of the first block 1 and the second block 2 is relatively simple.

Finally, the blowing device (not shown) is operated to force air into the discharging channel 11 via the blowing inlet 122 to blow the particles accumulated on the filtering unit 3 away from the filtering unit 3.

To sum up, by virtue of the spiral fluid channel 212 that has a relatively long distance for the molten metal flowing therein to be cooled down and be solidified, and the cooling channel 216 that surrounds the spiral fluid channel 212 to facilitate heat dissipation of the spiral fluid channel 212, molten metal flowing into the spiral fluid channel 212 can be solidified at a relatively high speed so as to block the spiral fluid channel 212 and prevent the molten metal from flowing into and damaging the vacuum chamber and the vacuum pump. The vacuum valve of the present disclosure is simple to use, is cost effective, is relatively compact, and occupies a smaller room than the conventional vacuum valves described in the background section. Further, the structure of the frustoconical guiding portion 13 and the groove 131 having a draft angle facilitates separation of the first and second blocks 1, 2. Additionally, the design of the filtering unit 3 prevents particles such as metal swarfs and release agents from entering the vacuum hose, and the filtering unit 3 can be cleaned by simply blowing air via the blowing inlet 122.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vacuum valve comprising:
    a first block including a base portion and a frustoconical guiding portion that is connected to said base portion and that tapers away from said base portion to form a shoulder between said base portion and said frustoconical guiding portion, and defining a discharging channel that extends in said base portion and through said frustoconical guiding portion, that is in spatial communication with ambient surroundings, and that is adapted to permit air to flow therethrough and into the ambient surroundings; and
    a second block having an end surface cooperating with said shoulder to define an opening therebetween that is adapted to communicate spatially with the ambient surroundings, and an inner surface connected to said end surface and cooperating with said frustoconical guiding portion of said first block to define a spiral fluid channel therebetween, said fluid channel being in spatial communication with said discharging channel and said opening, and being adapted for introducing air into said discharging channel via said opening.

2. The vacuum valve as claimed in claim 1, wherein said guiding portion of said first block has a cone angle ranging from 5 degrees to 30 degrees.

3. The vacuum valve as claimed in claim 1, wherein said second block includes a receiving portion receiving said frustoconical guiding portion therein, and an external fixing portion sleeved on said receiving portion, and cooperating with said receiving portion to define a cooling channel therebetween, said cooling channel extending spirally around said receiving portion and surrounding said fluid channel, said external fixing portion being formed with an inlet and an outlet that are in spatial communication with said cooling channel, so as to allow a cooling fluid to flow into said cooling channel through said inlet and out of said cooling channel through said outlet, thereby dissipating heat from said fluid channel.

4. The vacuum valve as claimed in claim 3, wherein said frustoconical guiding portion of said first block has an outer surface formed with a groove that extends spirally from one end of said frustoconical guiding portion to the other end of said frustoconical guiding portion, and that cooperates with said inner surface of said receiving portion of said second block to define said fluid channel.

5. The vacuum valve as claimed in claim 4, wherein said groove has a draft angle ranging from 1 degree to 3 degrees.

6. The vacuum valve as claimed in claim 3, wherein said receiving portion of said second block has an outer surface formed with a spiral flowway that cooperates with an inner surface of said fixing portion to define said cooling channel.

7. The vacuum valve as claimed in claim 1, further comprising a filtering unit detachably mounted in said discharging channel and adapted for filtering particles in the air flowing therethrough, said base portion being formed with a blowing inlet in spatial communication with said discharging channel, disposed downstream of said filtering unit in said discharging channel, and adapted to permit air to be forced into said discharging channel therethrough to blow the particles accumulated on said filtering unit away from said filtering unit.

8. The vacuum valve as claimed in claim 7, wherein said base portion of said first block is further formed with an outlet in spatial communication with said discharging channel and adapted to permit the air introduced into said discharging channel to be discharged out of said discharging channel therethrough, said filtering unit being further adapted for preventing particles in the air from moving into said outlet.

\* \* \* \* \*